(12) United States Patent
Knighten

(10) Patent No.: US 6,434,312 B1
(45) Date of Patent: *Aug. 13, 2002

(54) SHIELD FOR FIBER OPTIC CONNECTORS AND CABLES

(75) Inventor: James L. Knighten, Poway, CA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/465,734

(22) Filed: Dec. 17, 1999

(51) Int. Cl.[7] .................................................. G02B 6/00
(52) U.S. Cl. ............................ 385/134; 385/75; 385/92
(58) Field of Search .............................. 385/134, 135, 385/136, 137, 88, 89, 90, 91, 92, 94, 75

(56) References Cited

U.S. PATENT DOCUMENTS

| 4,148,543 A | * | 4/1979 | Shores ................... 339/143 R |
| 5,448,676 A | * | 9/1995 | White et al. .................. 385/88 |
| 6,000,856 A | * | 12/1999 | Yunker ........................ 385/75 |
| 6,085,006 A | * | 7/2000 | Gaio et al. .................... 385/92 |

* cited by examiner

Primary Examiner—Cassandra Spyrou
Assistant Examiner—Euncha Cherry
(74) Attorney, Agent, or Firm—Charlene Stukenborg

(57) ABSTRACT

A shield for fiber optic connectors and cables is provided. This shield minimizes the effects of EMI (electromagnetic interference) either radiating from or radiating into an electronic enclosure. Embodiments include this shield as an integral part of the enclosure chassis, a separate shield, or integrated into the fiber optic cable and connector.

16 Claims, 4 Drawing Sheets

SHIELD FOR FIBER OPTIC CONNECTORS AND CABLES

The present invention relates to a shield for fiber optic connectors and cables which minimizes the electromagnetic interference (EMI) energy entering or leaving an enclosure for associated electrical computer components.

BACKGROUND OF THE INVENTION

As digital data and edge rates increase, multi-processing computer systems increasingly use fiber optic links for data transmission. Particularly, systems for transmitting large blocks of data in short intervals of time and systems for transmitting high speed data over relatively long distances use fiber optic links. A common high speed application is the connection between computer nodes in parallel processing computing and the high data rate connections between computers and data storage.

A common misperception associated with the use of fiber optic links is that fiber optic links eliminate all problems with electromagnetic interference (EMI) regulatory certification compliance. This misperception (that use of fiber optics eliminates EMI concerns) likely stems from past fiber optic systems when either analog signals or low speed digital signals were transmitted by the fiber optics. Probably due to this misperception, most fiber optic connectors are not designed to minimize EMI effects.

Currently, modern high data rate fiber optic data transmission systems present a range of significant EMI problems. While the fiber optic cable does not radiate electromagnetic energy, the electrical computer components that feed the optical transmission system can cause EMI to radiate. Additionally, EMI problems may arise due to susceptibility of the electronic system to electromagnetic noise created by neighboring equipment that can create component damage, system upset, data error or related problems.

EMI may enter a computer system in various ways such as via various apertures and conducted points of entry associated with a typical electrical enclosure. Particularly, EMI may enter a computer system enclosure via the substantial electrical aperture associated with a fiber optic cable connector. This electrical aperture occurs between the fiber optic connector and the electrical enclosure because the fiber optic connector body is constructed from plastic, rather than metal (or any other electrically conductive material). This electrical aperture is a common point of entry or exit for EMI energy in current systems with fiber optic links.

Accordingly, there is a need for a shield for fiber optic connectors and cables which minimizes the EMI energy entering or leaving an enclosure via the fiber optic connector electrical aperture.

SUMMARY OF THE INVENTION

In accordance with the teachings of the present invention, a shield for fiber optic connectors and cables is provided. This shield minimizes the effects of EMI either radiating from or radiating into an electronic enclosure. Embodiments include this shield as an integral part of the enclosure chassis, a separate shield, or integrated into the fiber optic cable and connector.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE INVENTION

Figure 1:
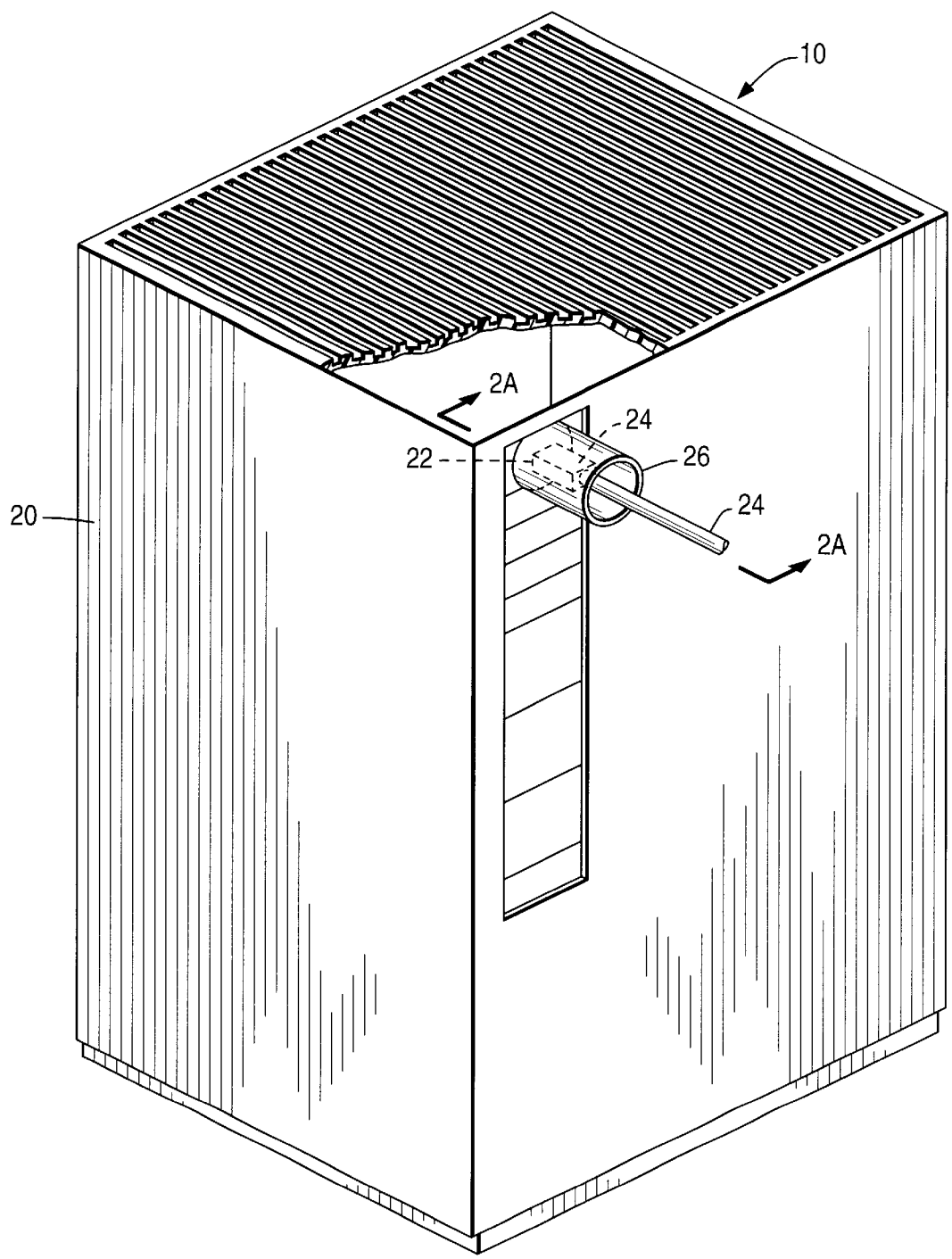
FIG. 1 shows a typical electronic enclosure including an integrated EMI shield in accordance with the present invention.
Figure 2A:
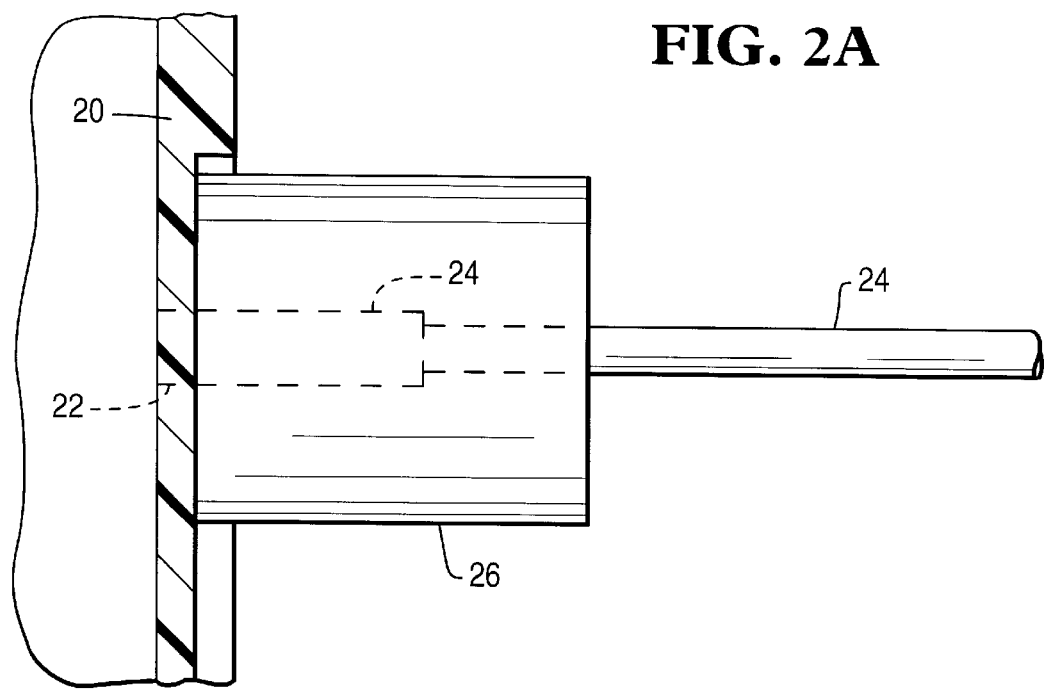
FIG. 2A shows a side view and FIG. 2B shows an end view of the integrated EMI shield of FIG. 1.
Figure 2B:
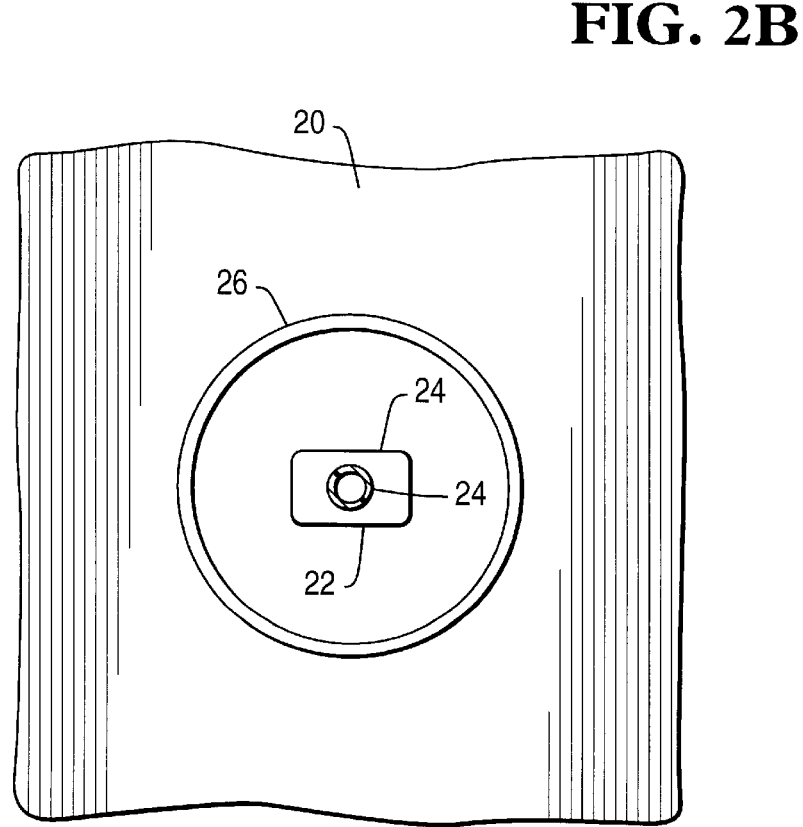

Referring now to the drawings, in which like-referenced characters indicate corresponding elements throughout the several views, attention is first drawn to FIGS. 1, 2A and 2B which show a typical electronic enclosure 10 including a chassis panel 20 for external connections. Electronic enclosure 10 houses electronic subsystems, such as components of a multiple processor computer system, which includes fiber optic links. Only the components necessary for an understanding of the present invention are shown and discussed herein.

Chassis panel 20 includes an aperture for a panel connector 22 into which fiber optic cable and connector 24 may be mounted. Panel connector 22 may be secured to the surface of chassis panel 20. According to a first embodiment of the present invention, an integrated EMI shield 26 is attached to the chassis panel 20 so that the aperture for the panel connector 22 is at the entrance to the integrated EMI shield 26. The integrated EMI shield 26 may be formed of a metallic pipe and may have a circular cross section as shown in FIGS. 1 and 2B. The integrated EMI shield 26 acts as a waveguide through which electromagnetic waves propagate. It is important that the integrated EMI shield 26 is attached so that the aperture for the panel connector 22 is at the entrance to the waveguide and that there is virtually no other egress for the electromagnetic energy than through the waveguide.

In general, electromagnetic waves propagate through a waveguide as long as the frequency of the wave is higher than the cutoff frequency of the waveguide. The geometry of the cross section of the waveguide determines the cutoff frequency of the waveguide. Below the cutoff frequency, electromagnetic waves do not propagate and are highly attenuated.

Sample calculations for determining the cutoff frequency of a few common waveguide are as follows:

Circular Cross Section Waveguide $$f_{cutoff} = \frac{1.841}{2\pi a \sqrt{\varepsilon \mu}}, \text{ where}$$

$f_{cutoff}$=frequency in Hertz $a$=diameter of the circular aperture in meters
$\varepsilon$=permittivity of the media within the waveguide
$\mu$=permeability of the media within the waveguide Circular Cross Section Waveguide Filled With Air $$f_{cutoff} = \frac{5.523 \times 10^8}{2\pi a} \text{ Hz}$$

Rectangular Cross Section Waveguide Filled With Air $$f_{cutoff} = \frac{1.5 \times 10^8}{b} \text{ Hz,}$$

where $f_{cutoff}$=frequency in Hertz
b=width of waveguide in meters (width greater than height)

The length of the waveguide determines the degree of attenuation of frequencies below the cutoff frequency. Although any length of waveguide operating below the cutoff frequency will provide shielding attenuation, in practice, lengths greater than the general waveguide width are usually required to achieve desired attenuations. For waveguides of circular cross section, lengths greater than the diameter are usually required to achieve desired attenuation. For waveguides of rectangular cross section, lengths greater than the largest cross sectional dimension are usually required to achieve desirable levels of attenuation. For waveguides of any other cross sectional shape, lengths greater than the maximum width dimension are usually required to achieve desired attenuation levels.

Practical diameters of a circular waveguide shield exhibit cutoff frequencies that are very high, in the Gigahertz range ($10^9$) and higher. Thus, most frequencies associated with electromagnetic interference are below the cutoff frequency and the waveguide shield of the present invention acts as an EMI barrier.

Figure 3:
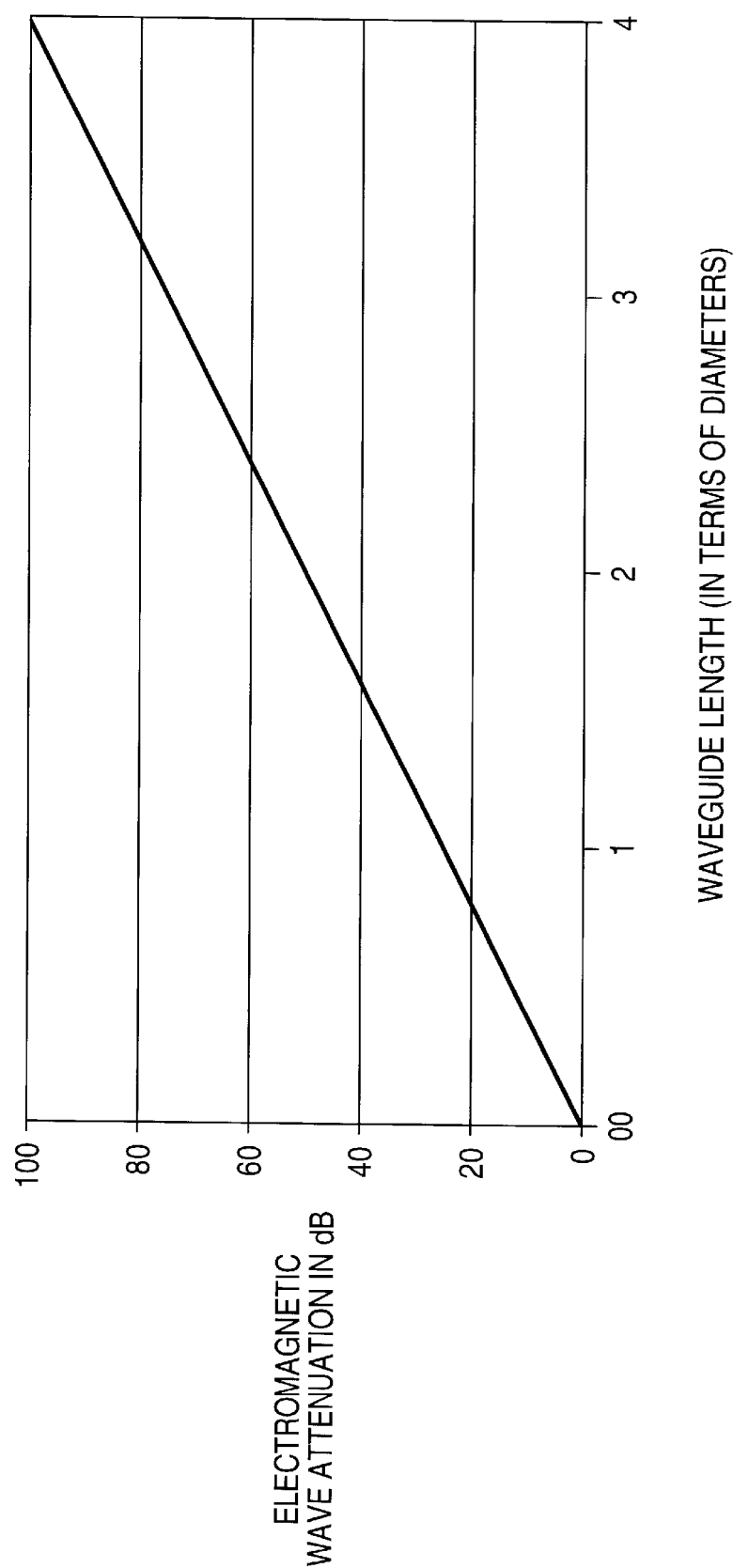
FIG. 3 shows a graphical example of attenuation achievable using an EMI shield in accordance with the present invention.

FIG. 3 shows a graphical example of the level of field attenuation achievable by the present invention at 1 GHz with a waveguide having a diameter of 2 cm (cutoff frequency of 7.5 GHz). The plot shows attenuation versus length of the waveguide tube, i.e. the number of diameters in the length of the guide. Attenuation is expressed in decibels (dB) which is a logarithmic scale, 20 dB corresponds to a factor of 10, 40 dB to a factor of 100, 60 dB to a factor of 1000, etc.

Figure 4:
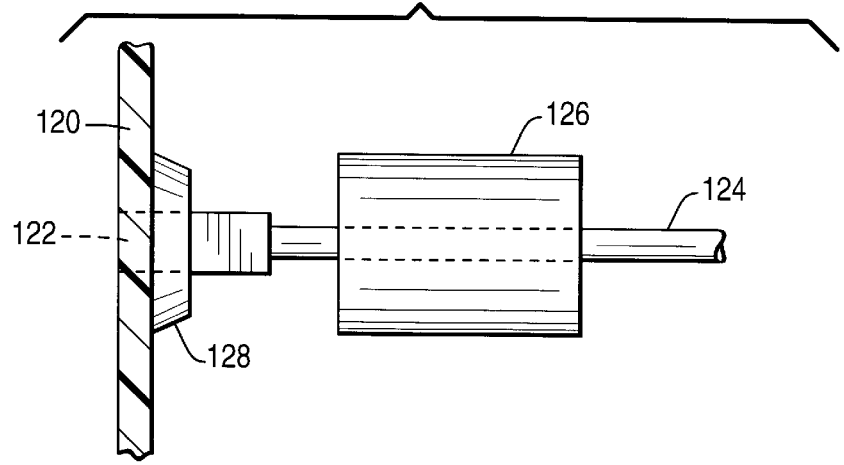
FIG. 4 shows a side view of a first design of a separate EMI shield in accordance with the present invention.

In a second embodiment of the present invention, the waveguide shield is not a permanently integrated part of the chassis sheet metal but rather is a separate component. Attention is directed to FIG. 4 which shows a side view of a first design of a separate shield 126 and associated chassis panel 120. Chassis panel 120 includes an aperture for the panel connector 122 for fiber optic cable and connector 124.

A tapered flange or collar 128 mounts onto the chassis panel 120 and provides a virtually continuous (360 degree for the circular cross-section waveguide) peripheral electrical bond when the sleeve-like shield is firmly fitted into place. This fitting may be press-fit, twist-on, or any other type of bond which provides the necessary substantially continuous electrical connection between the chassis panel 120 and the sleeve-like shield 126. The tapered-shape of the flange or collar provides a means for forcing the mating surfaces tightly together to improve electrical conduction between the elements. The sleeve-like shield 126 may be formed of a metallic pipe and may have a circular cross section as shown.

Figure 5A:
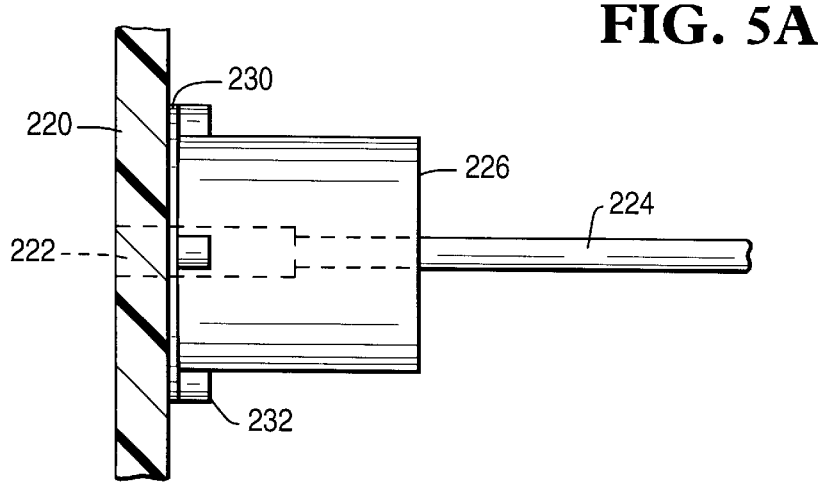
FIG. 5A shows a side view and FIG. 5B shows an end view of a second design of a separate EMI shield in accordance with the present invention.
Figure 5B:
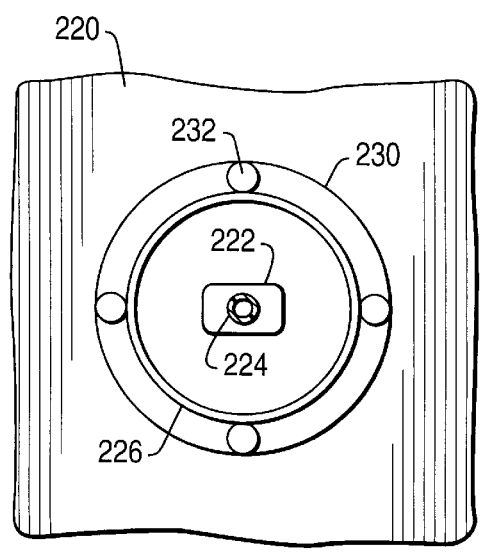

As shown in FIGS. 5A and 5B, a second design of a separate shield 226 includes screws 232 or other fasteners and, optionally, an EMI gasket 230 to insure the necessary continuous electrical connection is achieved. The EMI gasket is formed of an electrically conductive material and provides the electrical connection between the separate shield 226 and the chassis panel 220 in the area of the panel connector 222. The EMI gasket may be eliminated in cases where very good metal-to-metal electrical contact is achieved between the shield and chassis panel. The fiber optic cable and connector 224 connects with panel connector 222 in the conventional manner.

It is important to note that a good electrical connection must be maintained between the separate component and the chassis sheet metal in order for the shield to be effective. This good electrical connection causes the aperture to be located at the entrance to the waveguide and insures that there is virtually no other egress for the electromagnetic energy than through the waveguide. Having the shield as a separate component may facilitate easier manipulation of the fiber optic connectors and cables, particularly when connecting or disconnecting fiber optic cables.

In yet another embodiment of the present invention, the fiber optic cable and connector may include an integrated shield which, when mated with the panel connector, provides an effective waveguide shield. In this embodiment, the shield surrounding the connector may be inserted during a typical molding process for making a fiber optic cable and connector and must include some means for electrically connecting the integrated shield in a substantially continuous manner with the associated enclosure.

Although the above discussion has been directed to circular or rectangular waveguides, the cross section of the waveguide of the present invention may be any closed polygon. Although the above discussion has described the shield as metallic, any electrically conductive material which can provide the necessary electrical shielding can be used. One skilled in the art will recognize that some examples of electrically conductive materials include metallized plastic, metallized glass, and carbon coated plastic; however any electrically conductive material which can provide the necessary electrical shielding is contemplated within the scope of the present invention.

Although the invention has been described with particular reference to certain preferred embodiments thereof, variations and modifications of the present invention can be effected within the spirit and scope of the following claims.

What is claimed is:

1. An apparatus for minimizing electromagnetic interference energy radiating from and entering into an electronic enclosure through a panel connector connecting to a fiber optic connector, comprising:
   an electrically conductive shield having a closed cross section surrounding the fiber optic connector and attaching to an external surface of the electronic enclosure, the electrically conductive shield having a length beginning at the external surface of the electronic enclosure and extending therefrom so that the electrically conductive shield forms a waveguide having a cutoff frequency higher than operating frequencies of the electronic system within the electronic enclosure and wherein the length of the electrically conductive shield determines the degree of attenuation of frequencies below the cutoff frequency.

2. The apparatus of claim 1 wherein the electrically conductive shield is formed of a metal.

3. The apparatus of claim 1 wherein the closed cross section is circular.

4. The apparatus of claim 1 wherein the closed cross section is rectangular.

5. The apparatus of claim 1 wherein the electrically conductive shield is an integral part of the electronic enclosure.

6. The apparatus of claim 1 wherein the electrically conductive shield is connected to the electronic enclosure through an electrically conductive gasket.

7. The apparatus of claim 1 wherein the electrically conductive shield is connected to the electronic enclosure through an electrically conductive flange.

8. The apparatus of claim 1 wherein the waveguide is filled with air.

9. The apparatus of claim 3 wherein the electrically conductive shield has a length greater than the diameter of the shield.

10. The apparatus of claim 3 wherein the electrically conductive shield has a length substantially equal to the diameter of the shield.

11. The apparatus of claim 1 wherein the diameter of the waveguide is 2 centimeters.

12. An electrical computer system, comprising:
   electrical components of an electronic system enclosed in an electrically conductive enclosure, the electrically conductive enclosure including a panel connector;
   a fiber optic connector mounted in the panel connector; and
   an electrically conductive shield around the fiber optic connector, wherein a first end of the electrically conductive shield attaches to an external surface of the electrically conductive enclosure so that the panel connector is at the entrance of a waveguide formed by the electrically conductive shield, the waveguide having a cutoff frequency higher than operating frequencies of the electronic system within the electrically conductive enclosure for minimizing electromagnetic interference energy radiating from and entering into the electrically conductive enclosure through the fiber optic connector.

13. The electrical computer system of claim 12 wherein the electrically conductive shield in an integral part of the electrically conductive enclosure.

14. The electrical computer system of claim 12 wherein the electrically conductive shield has a closed cross section that is circular.

15. The electrical computer system of claim 12 wherein the electrically conductive shield has a closed polygon cross section that is rectangular.

16. A electrical computer system, comprising:
   electrical components of an electronic system enclosed in an electrically conductive enclosure;
   a panel connector in the electrically conductive enclosure;
   a fiber optic connector connecting to the panel connector in the electrically conductive enclosure; and
   an electrically conductive shield around the fiber optic connector, the electrically conductive shield attaching to an external surface of the electrically conductive enclosure and having a length beginning at the external surface of the electrically conductive enclosure and extending therefrom so that the electrically conductive shield forms a waveguide having a cutoff frequency higher than operating frequencies of the electronic system within the electrically conductive enclosure and having the length which determines the degree of attenuation of frequencies below the cutoff frequency for minimizing electromagnetic interference energy radiating from and entering into the electrically conductive enclosure through the fiber optic connector.

* * * * *